United States Patent
Zimmerman

(10) Patent No.: US 12,333,024 B2
(45) Date of Patent: Jun. 17, 2025

(54) SYSTEMS AND METHODS FOR IMPLEMENTING MOBILE NUMBER SECURITY PROTECTIONS

(71) Applicant: TracFone Wireless, Inc., Miami, FL (US)

(72) Inventor: James Zimmerman, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 226 days.

(21) Appl. No.: 18/074,002

(22) Filed: Dec. 2, 2022

(65) Prior Publication Data

US 2023/0177175 A1 Jun. 8, 2023

Related U.S. Application Data

(60) Provisional application No. 63/285,708, filed on Dec. 3, 2021.

(51) Int. Cl.
*G06F 21/60* (2013.01)
(52) U.S. Cl.
CPC .................. *G06F 21/602* (2013.01)

(58) Field of Classification Search
CPC ...................................... G06F 21/602
See application file for complete search history.

(56) References Cited

U.S. PATENT DOCUMENTS

| | | | | |
|---|---|---|---|---|
| 2014/0237576 A1* | 8/2014 | Zhang | ..................... | G06F 21/32 726/7 |
| 2017/0359358 A1* | 12/2017 | Alattar | ................... | G06Q 20/12 |
| 2020/0313910 A1* | 10/2020 | Lindemann | .......... | H04L 9/3247 |

FOREIGN PATENT DOCUMENTS

WO WO-2016070295 A1 * 5/2016 ............. G06Q 20/32

\* cited by examiner

*Primary Examiner* — Mohammad W Reza

(57) ABSTRACT

A system configured to implement mobile number security protections includes a computer system configured to obtain one or more of time dependent data, encryption data, and device related data; the computer system is further configured to generate a system generated code based on one or more of the time dependent data, the encryption data, and the device related data; the computer system is further configured to receive a wireless device generated code generated by a wireless device; and the computer system is further configured to compare the wireless device generated code generated by the wireless device to the system generated code generated by the computer system.

19 Claims, 4 Drawing Sheets

SYSTEMS AND METHODS FOR IMPLEMENTING MOBILE NUMBER SECURITY PROTECTIONS

CROSS-REFERENCE TO RELATED APPLICATIONS

This application claims the benefit of U.S. Provisional Application No. 63/285,708 filed on Dec. 3, 2021 and entitled "System, Device, and Process Implementing Mobile Number Security Protections," the content of which is incorporated by reference herein in its entirety.

TECHNICAL FIELD

The disclosure relates to a system implementing mobile number security protections. The disclosure further relates to a device implementing mobile number security protections. The disclosure further relates to a process implementing mobile number security protections.

BACKGROUND

Recently there has been a dramatic increase in mobile device identification takeovers. This results in numerous security issues for customers, companies, and/or the like. For example, mobile device identification takeovers may be a result of a bad actor taking control of a wireless device account and an associated phone number. The bad actor can then use the phone number to make and receive phone calls, texts, and/or the like. Additionally, the bad actor might be able to access online bank accounts, credit card portals, email, social media accounts, and/or the like relying on the one-time personal identification numbers (PINs) that many financial institutions, social media companies, and/or the like use to verify the identity of their customers.

For example, the bad actor may utilize subscriber identity module (SIM) card swap fraud to obtain a new SIM card. The bad actor can then insert the new SIM card into any other device, giving the bad actor the ability to make calls and receive texts using a fraudulently obtained phone number. As another example, the bad actor might rely on phishing emails. For example, emails supposedly sent by legitimate banks, credit card providers, and other companies but actually sent by the bad actor to conduct mobile device identification takeovers. As a further example, a bad actor armed with enough of personal information may port or move a phone number from a current provider to another provider.

To address these mobile device identification takeovers, a layered security architecture may be implemented. For example, the layered security architecture may implement a 2 factor Short Message Service (SMS) process. However, such layered security solutions fail to fully address security risks related to mobile device identification takeovers as the bad actor may take over the mobile device and receive the 2 factor SMS messages.

Accordingly, what is needed is a system and process to reduce mobile device identification takeovers.

SUMMARY

One aspect includes a system configured to implement mobile number security protections, the system configured to implement mobile number security protections includes: a computer system configured to obtain one or more of time dependent data, encryption data, and device related data; the computer system is further configured to generate a system generated code based on one or more of the time dependent data, the encryption data, and the device related data; the computer system is further configured to receive a wireless device generated code generated by a wireless device; the computer system is further configured to compare the wireless device generated code generated by the wireless device to the system generated code generated by the computer system; the computer system is further configured to allow transactions by the wireless device if the wireless device generated code generated by the wireless device matches the system generated code generated by the computer system; and the computer system is further configured to prevent transactions by the wireless device if the wireless device generated code generated by the wireless device does not match the system generated code generated by the computer system.

One aspect includes a system configured to implement mobile number security protections, the system configured to implement mobile number security protections includes: a computer system configured to obtain one or more of time dependent data, encryption data, and device related data; the computer system is further configured to generate a system generated code based on one or more of the time dependent data, the encryption data, and the device related data; the computer system is further configured to receive a wireless device generated code generated by a wireless device; the computer system is further configured to compare the wireless device generated code generated by the wireless device to the system generated code generated by the computer system; and the computer system is further configured to allow transactions by the wireless device if the wireless device generated code generated by the wireless device matches the system generated code generated by the computer system.

One aspect includes a system configured to implement mobile number security protections, the system configured to implement mobile number security protections includes: a computer system configured to obtain one or more of time dependent data, encryption data, and device related data; the computer system is further configured to generate a system generated code based on one or more of the time dependent data, the encryption data, and the device related data; the computer system is further configured to receive a wireless device generated code generated by a wireless device; the computer system is further configured to compare the wireless device generated code generated by the wireless device to the system generated code generated by the computer system; and the computer system is further configured to prevent transactions by the wireless device if the wireless device generated code generated by the wireless device does not match the system generated code generated by the computer system.

One aspect includes a process for implementing mobile number security protections, the process for implementing mobile number security protections includes: obtaining with a computer system one or more of time dependent data, encryption data, and device related data; generating with the computer system a system generated code based on one or more of the time dependent data, the encryption data, and the device related data; receiving with the computer system a wireless device generated code generated by a wireless device; comparing with the computer system the wireless device generated code generated by the wireless device to the system generated code generated by the computer system; allowing with the computer system transactions by the wireless device if the wireless device generated code generated by the wireless device matches the system generated code generated by the computer system; and preventing with the computer system transactions by the wireless device if the wireless device generated code generated by the wireless device does not match the system generated code generated by the computer system.

One aspect includes a process for implementing mobile number security protections, the process for implementing mobile number security protections includes: obtaining with a computer system one or more of time dependent data, encryption data, and device related data; generating with the computer system a system generated code based on one or more of the time dependent data, the encryption data, and the device related data; receiving with the computer system a wireless device generated code generated by a wireless device; comparing with the computer system the wireless device generated code generated by the wireless device to the system generated code generated by the computer system; and allowing with the computer system transactions by the wireless device if the wireless device generated code generated by the wireless device matches the system generated code generated by the computer system.

A large number of wireless service plans exist for customers desiring wireless services such as voice call service, data service, and/or text messaging service. To obtain these wireless services, customers generally have the option of entering into a post-paid service, e.g., contract for a period of time, or a pre-paid, contract-free service. The latter offers customers the freedom to initiate and stop wireless services without incurring expensive cancellation fees associated with a post-paid service.

Generally, companies that provide post-paid wireless services are wireless carriers or Mobile Network Operators (MNOs) that maintain and control their own wireless networks. An MNO heavily relies on backend systems to address any provisional, billing, security, and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including volume of data, number of voice minutes, and number of text messages used.

Convenience, timeliness, and reliability of wireless providers are key factors that play into a user's experience. By developing a system to improve at least these factors, a more positive experience can be provided to the user. The improved experience will help retain customer base and increase the amount of customers willing to purchase wireless services from MNOs and MVNOs. In order to do so, the following needs can be addressed by enabling new and improved system and process implementing mobile number security protections, which may be applicable to both MNOs and MVNOs.

The foregoing needs are met, to a great extent, by the disclosure, providing a system and process implementing mobile number security protections.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

Figure 1:
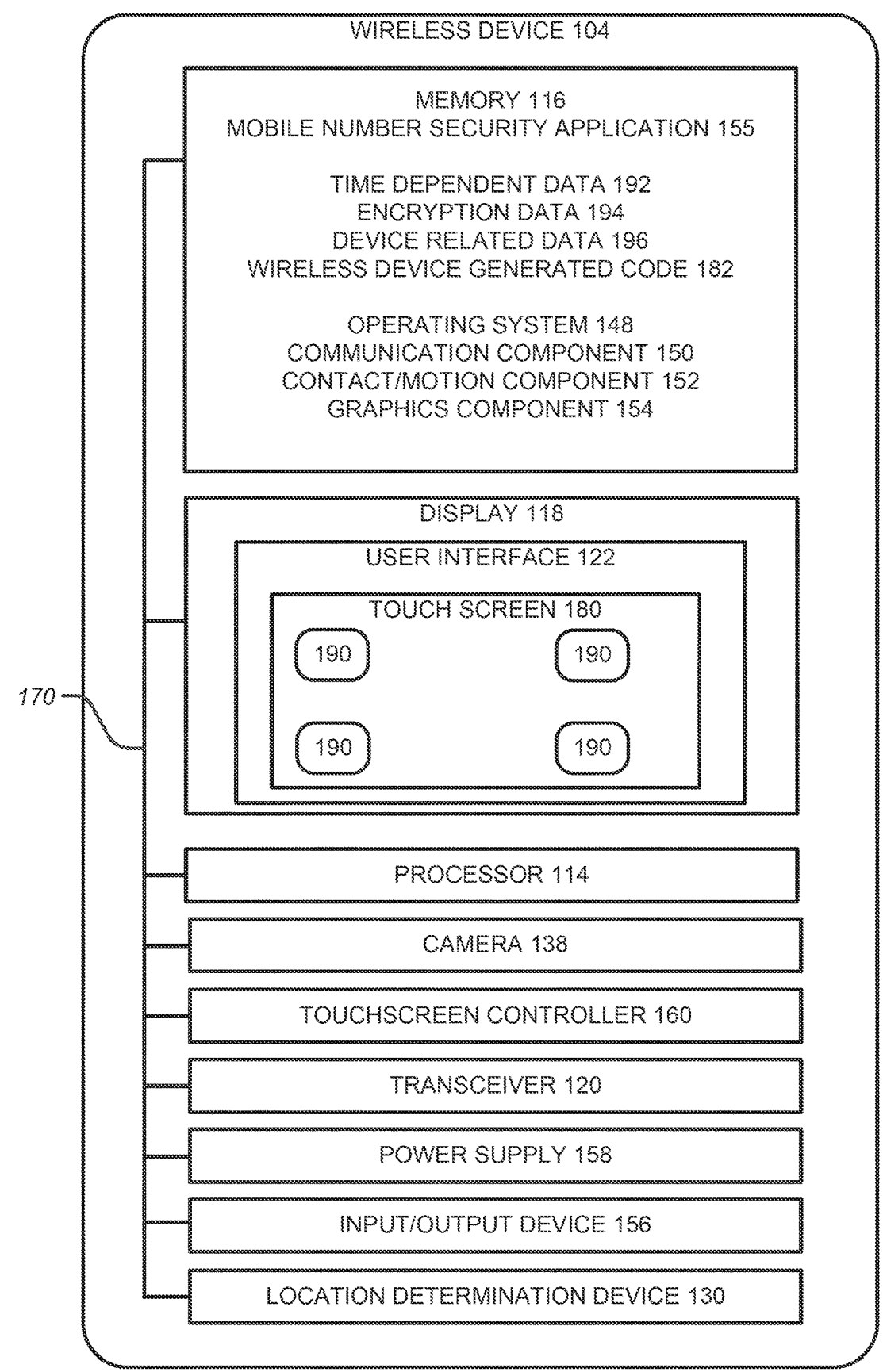
FIG. 1 illustrates a block diagram of a wireless device with exemplary components in accordance with aspects of the disclosure.

In this specification and claims it is to be understood that reference to a wireless device is intended to encompass electronic devices such as mobile phones, tablet computers, gaming systems, MP3 players, personal computers, PDAs, and the like. A "wireless device" is intended to encompass any compatible mobile technology computing device that can connect to a wireless communication network, such as mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone."

Wireless devices may connect to a "wireless network" or "network" and are intended to encompass any type of wireless network to obtain or provide mobile phone services through the use of a wireless device, such as the Global System for Mobile Communication (GSM) network, Code-Division Multiple Access (CDMA) network, Long-Term Evolution (LTE) network, 5G network, that may utilize the teachings of the present application.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described, which may be requirements for some aspects but not for other aspects.

The disclosed system and process implementing mobile number security protections may be implemented in a wireless device application that implements a secure identification that can be generated by the wireless device and provided to a wireless carrier system and/or other system. In some aspects, the disclosed system and process implementing mobile number security protections may be implemented for specific and "High Risk" transactions. In other aspects, the disclosed system and process implementing mobile number security protections may be implemented for specific transactions, a majority of transactions, and/or all transactions.

The disclosed system and process implementing mobile number security protections is different from a 2 Factor SMS process in that a specific wireless device may generate a specific wireless device generated code and a wireless carrier implementing the disclosed system and process may only accept the specific wireless device generated code.

In aspects, the specific wireless device generated code implemented by the disclosed system and process implementing mobile number security protections may be generated by a combination of one or more of time dependent data, encryption data, device related data, and/or the like.

In aspects, the specific wireless device generated code implemented by the disclosed system and process implementing mobile number security protections may be generated by a combination of one or more of a phone number, device identification data, a current time, a current date, a secret hash code, and/or the like.

In aspects, the specific wireless device generated code implemented by the disclosed system and process implementing mobile number security protections may be generated by a combination of one or more a Mobile Directory Number (MDN) of the wireless device, an International Mobile Equipment Identity (IMEI) number of the wireless device, an Integrated Circuit Card Identifier (ICCID) number of the wireless device, an Electronic Serial Number (ESN) of the wireless device, a Mobile Equipment Identifier (MEID) of the wireless device, a serial number for a subscriber identity module (SIM) card of the wireless device, a current time from a wireless network, a current date from a wireless network, and/or a secret hash code.

In aspects, the specific wireless device generated code implemented by the disclosed system and process implementing mobile number security protections may be generated by a combination of a triplet of a Mobile Directory Number (MDN) of the wireless device, an International Mobile Equipment Identity (IMEI) number of the wireless device, an Integrated Circuit Card Identifier (ICCID) number of the wireless device, an Electronic Serial Number (ESN) of the wireless device, a Mobile Equipment Identifier (MEID) of the wireless device, and/or a serial number for a subscriber identity module (SIM) card of the wireless device, a current time from a wireless network and/or a current date from a wireless network, and/or a secret hash code. In aspects, the current time from a wireless network may be in minutes.

In aspects, the specific wireless device generated code implemented by the disclosed system and process implementing mobile number security protections may change every minute and the secret hash code or other encryption may be different for every wireless device and/or every minute of the day.

In aspects, the specific wireless device generated code implemented by the disclosed system and process implementing mobile number security protections may also be generated in a computer system, such as a wireless carrier system. In this regard, the specific wireless device generated code generated by the wireless device may be compared to the specific wireless device generated code generated by the computer system to ensure a match before allowing a transaction.

The disclosed system and process implementing mobile number security protections may provide a unique approach to security as a bad actor would need to gain access to the wireless device, an application implementing the disclosed system and process implementing mobile number security protections and any change of the specific wireless device generated code would break the match. Accordingly, this makes it very difficult for mobile device identification takeovers without actual possession of the wireless device. Accordingly, transactions may have an increased level of security.

The disclosed system and process implementing mobile number security protections may be used or shared with other entities as well. Accordingly, transactions conducted with other entities may likewise have an increased level of security.

Additionally, the disclosed system and process implementing mobile number security protections may be used as a replacement for a password. In this regard, the disclosed system and process implementing mobile number security protections may be used as a dynamic password. In particular, a dynamic password that a user does not need to remember.

FIG. 1 illustrates a block diagram of a wireless device with exemplary components in accordance with aspects of the disclosure.

In particular, FIG. 1 illustrates a wireless device 104. The wireless device 104 may include a processor 114, a memory 116, a transceiver 120, and a mobile number security application 155.

The processor 114 may be a central processing unit configured to execute instructions such as instructions related to software programs. In particular, the processor 114 may be configured to execute instructions such as instructions related to the mobile number security application 155. Any processor can be used for the wireless device 104 as understood to those of ordinary skill in the art. In one aspect, the processor 114 may be a microprocessor, a chipset, and/or the like.

The memory 116 of the wireless device 104 may include the mobile number security application 155. The mobile number security application 155 may be preinstalled, downloaded from an application store, and/or the like.

The mobile number security application 155 may be configured to generate a wireless device generated code 182. As described in further detail below, there are numerous ways that the wireless device generated code 182 can be generated by the mobile number security application 155. Once the wireless device generated code 182 is generated by the wireless device 104, the mobile number security application 155, the processor 114, and/or the like, the wireless device generated code 182 may be provided to a computer system in order to conduct transactions with the computer system. For example, the computer system may be the computer system 710 illustrated in FIG. 2, another computer system, a wireless carrier computer system, and/or the like. In this regard, a transaction may include a number of different types of activities including monetary transactions, data transactions, information transactions, transactions involving accessing online resources, and/or the like that may be generally referred to herein as computer transactions.

The transceiver 120 and/or the processor 114 may provide radio and signal processing as needed to access a wireless network for services. The transceiver 120 and/or the processor 114 may be configured to process call functions, data transfer, and the like and provide an array of services, based on those functions, to the user.

In particular aspects, the transceiver 120 and/or the processor 114 may obtain and/or generate time dependent data 192. The time dependent data 192 may include one or more of a current time that may be obtained from a wireless network, a current date that may be obtained from a wireless network, and/or the like. The mobile number security application 155 may thereafter store the time dependent data 192 in a memory such as the memory 116. The mobile number security application 155 may thereafter utilize the time dependent data 192 as further described herein to, at least in part, generate the wireless device generated code 182.

In particular aspects, the transceiver 120 and/or the processor 114 may obtain and/or generate encryption data 194. The encryption data 194 may include one or more of a secret hash code, a ciphertext, an encryption key, a pseudo-random encryption key, a symmetric-key, a decryption key, a public key, and/or the like. The mobile number security application 155 may thereafter store the encryption data 194 in the memory such as the memory 116. The mobile number security application 155 may thereafter utilize the encryption data 194 as further described herein to, at least in part, generate the wireless device generated code 182. In particular aspects, the encryption data 194 may be obtained from a security system 700, the computer system 710, and/or the like.

In particular aspects, the transceiver 120 and/or the processor 114 may obtain and/or generate device related data 196. In particular aspects, the device related data 196 may be stored on the wireless device 104. The device related data 196 may include one or more of a Mobile Directory Number (MDN) from the wireless network and/or the wireless device 104, an International Mobile Equipment Identity (IMEI) number from the wireless network and/or the wireless device 104, an Integrated Circuit Card Identifier (ICCID) number from the wireless network and/or the wireless device 104, an Electronic Serial Number (ESN) from the wireless network and/or the wireless device 104, a Mobile Equipment Identifier (MEID) from the wireless network and/or the wireless device 104, a serial number for a subscriber identity module (SIM) card from the wireless network and/or the wireless device 104, and/or the like. The mobile number security application 155 may thereafter store the device related data 196 in memory such as the memory 116. The mobile number security application 155 may thereafter utilize the device related data 196 as further described herein to, at least in part, generate the wireless device generated code 182.

Once the wireless device 104, the mobile number security application 155, the processor 114, and/or the like have the time dependent data 192, the encryption data 194, the device related data 196, and/or the like, the processor 114 may utilize this data in conjunction with the mobile number security application 155 in order to generate the wireless device generated code 182. In one aspect, the wireless device generated code 182 may be generated based on one or more of the time dependent data 192, the encryption data 194, and/or the device related data 196. In one aspect, the wireless device generated code 182 may be generated based on all of the time dependent data 192, the encryption data 194, and/or the device related data 196.

In various aspects, the wireless device generated code 182 may be generated by an algorithm, a lookup table, and/or the like based on one or more of the time dependent data 192, the encryption data 194, and/or the device related data 196. The wireless device generated code 182 may uniquely represent symbols, encoded strings, sequences of symbols, a mapping, variable-length codes, a prefix code, data, character encoding, a number of bytes, an encoding, a specific encoding, a markup language, a tag structure, and/or the like. The algorithm generating the wireless device generated code 182 may include a finite sequence of well-defined instructions to perform a computation, calculations, data processing, and/or the like based on one or more of the time dependent data 192, the encryption data 194, and/or the device related data 196. In one aspect, the algorithm generating the wireless device generated code 182 may include a finite sequence of well-defined instructions to perform a computation, calculations, data processing, and/or the like based on a triplet of the time dependent data 192, the encryption data 194, and/or the device related data 196.

Thereafter, the wireless device 104, the mobile number security application 155, the processor 114, and/or the like may transmit the wireless device generated code 182 over a network to the computer system 710, the security system 700, another computer system, a wireless carrier system, and/or the like. In particular, the wireless device 104, the mobile number security application 155, the processor 114, and/or the like may transmit the wireless device generated code 182 over a network to the computer system 710 in response to a request by the computer system 710, a request from another computer system, a request from the security system 700, a request from a wireless carrier system, and/or the like. In particular, the wireless device 104, the mobile number security application 155, the processor 114, and/or the like may transmit the wireless device generated code 182 automatically when requested, automatically from time to time, and/or the like. The transmission of the wireless device generated code 182 may be transparent to the user of the wireless device 104, may require user interaction for transmission of the wireless device generated code 182 by the wireless device 104, and/or the like.

The memory 116 of the wireless device 104 may further include an operating system 148, a communication component 150, a contact/motion component 152, a graphics component 154, and the like. The operating system 148 together with the various components provides software functionality for each of the components of the wireless device 104. The memory 116 may include a high-speed, random-access memory. Also, the memory 116 may be a non-volatile memory, such as a magnetic fixed disk storage, a subscriber identity module (SIM), a Universal Integrated Circuit Card (UICC), a cloud-based memory, a flash memory, and/or the like. These various components may be connected through various communication lines including a data bus 170.

In another aspect of the disclosure, the memory 116 of the wireless device 104 can include a database for storing user information. The user information may include information such as full name, address, email address, contact number, credit card information, and/or the like. In one aspect, the database may include security questions. In another aspect, the database may include user specified preferences.

The display 118 may be a liquid crystal display (LCD), light-emitting diode (LED) display, or the like. The display 118 may include a backlight to illuminate the various color liquid crystals to provide a more colorful display. The user interface 122 may be any type of physical input as readily employed in the field. For example, the user interface 122 may have physical buttons. Alternatively, the user interface 122 may be implemented on a touchscreen 180, a motion sensor (not shown), and the like. Finally, the wireless device 104 may include a power supply 158.

In an exemplary aspect, the touchscreen 180 of the disclosure may be implemented in the display 118 and may detect a presence and location of a touch of a user within the display area. For example, touching the display 118 of the wireless device 104 with a finger or hand. The touchscreen 180 may also sense other passive objects, such as a stylus. Additionally, the wireless device 104 may further include a touch screen controller 160.

In one operation, the display 118 may show various implementations of the objects 190 associated with applications for execution by the processor 114. For example, a user may touch the display 118, particularly the touchscreen 180, to interact with the objects 190. That is, touching an object 190 may execute an application in the processor 114 associated with the object 190 that is stored in memory 116. Additionally or alternatively, touching an object 190 may open a menu of options to be selected by the user. The display 118 may include a plurality of objects 190 for the user to interact with. Moreover, the display 118 may include a plurality of screens. The display 118 showing one screen at a time. The user may interact with the display 118 to move a screen into view on the display 118. Various of the objects 190 may be located in each of the screens.

The touchscreen 180 may be implemented as a resistive touchscreen, a surface acoustic wave touch screen, a capacitive touchscreen, self-capacitance sensors, infrared sensors, dispersive signal technology, acoustic pulse recognition, or the like.

The display 118 is generally configured to display a user interface 122 or graphical user interface (GUI) that provides an easy to use visual interface between a user of the wireless device 104 and the operating system or application(s) running on the wireless device 104. Generally, the GUI presents programs, files, and operational options with graphical images. During operation, the user may select and activate various graphical images displayed on the display 118 in order to initiate functions and tasks associated therewith.

The wireless device 104 may include a camera 138 that is multifunctional. The camera 138 may be used to capture images such as of a person or place, biometric readings such as a fingerprint or a retina, letters, symbols, and numbers (optical character reading/machine code reading), an image of a machine code, which may include a bar code such as a QR code, a Data Matrix (DM) code, a Universal Product Code (UPC), and the like. The camera 138 may be on the front, back, sides and the like of the wireless device 104.

The camera 138 may include a charge coupled device (CCD), CMOS image sensors, Back Side Illuminated CMOS, or the like. Images captured by the camera 138 may be converted and stored in various formats including a JPEG file format, RAW feature format such as the Android (operating system) 5.0 Lollipop, and the like. Additionally, the wireless device 104 may include an application for display of images captured by the camera 138.

The wireless device 104 can include an audio input/output device 156. The audio input/output device 156 may include speakers, speaker outputs, and the like, providing sound output; and may include microphones, microphone inputs, and the like, for receiving sound inputs. In an exemplary aspect, the audio input/output device 156 may include an analog to digital converter and a digital to audio converter for audio input and output functions respectively.

In some aspects, the wireless device 104 may implement geolocation and/or estimate a location of the wireless device 104 based, at least in part, on a global navigation satellite system (GNSS) with a location determination device 130. In another aspect, a wireless network may secure location determination based on a specific cell in which the wireless device 104 connects. In yet another aspect, a wireless network may obtain location determination based on triangulation with respect to a plurality of cells in which the wireless device 104 receives signals.

Figure 2:
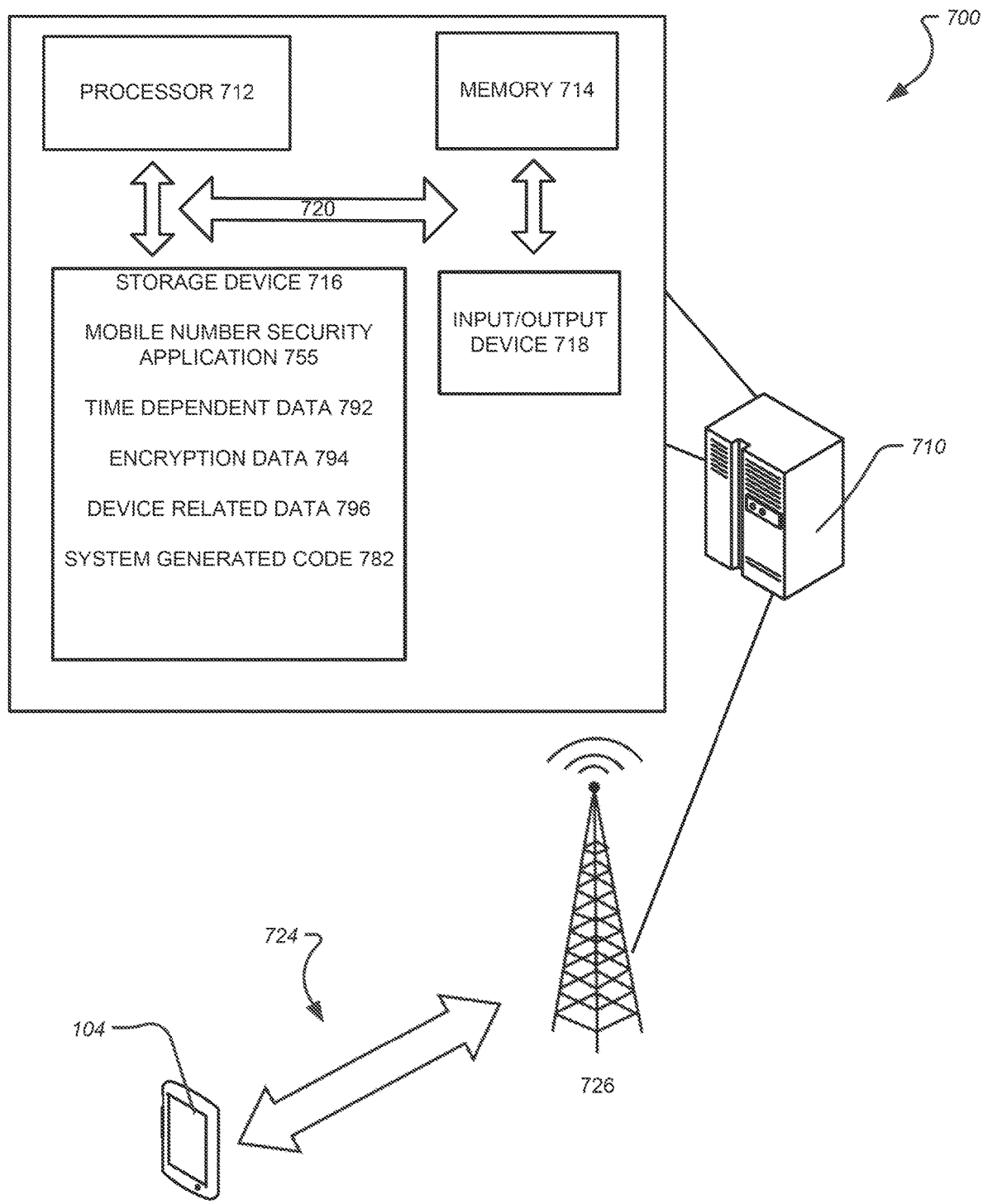
FIG. 2 illustrates an exemplary system according to aspects of the disclosure.

FIG. 2 illustrates an exemplary system according to aspects of the disclosure.

In particular, the disclosed system and process implementing mobile number security protections may include and/or may be implemented with a security system 700. The security system 700 may include, may implement, may connect to, and/or the like a communication channel 724, a computer system 710, a network 726, the wireless device 104, and/or the like. The security system 700 may be implemented by a wireless carrier, may be a stand-alone system, and/or the like. The computer system 710 may include a processor 712, a memory 714, a storage device 716, and an input/output device 718. In one aspect the processor 712 may be a server. In one aspect, the security system 700 may be implemented by the server.

The computer system 710 may implement a mobile number security application 755 that may be configured to generate a system generated code 782. The computer system 710 may generate the system generated code 782 in a manner consistent with the wireless device generated code 182 generated by the mobile number security application 155.

For example, the system generated code 782 may be based on time dependent data 792, encryption data 794, device related data 796, and/or the like. In aspects, the time dependent data 792 may be consistent with the time dependent data 192; the encryption data 794 may be generated consistent with the encryption data 194; and the device related data 796 may be generated consistent with the device related data 196.

In particular aspects, the time dependent data 792 may be obtained from a wireless network; the encryption data 794 may be stored, generated, and/or the like by the computer system 710; and the device related data 796 may be received from a wireless carrier. One or more of the time dependent data 792, the encryption data 794, the device related data 796, and/or the like may be stored in the storage device 716, the memory 714, and/or the like.

Additionally, the computer system 710 may receive the wireless device generated code 182 from the wireless device 104 over a network. Once the system generated code 782 is generated by the computer system 710, the mobile number security application 755, the processor 712, and/or the like may compare the wireless device generated code 182 generated by the wireless device 104, the mobile number security application 155, and/or the like to the system generated code 782 generated by the computer system 710.

If the computer system 710 determines that the wireless device generated code 182 generated by the wireless device 104 matches the system generated code 782 generated by the computer system 710, the computer system 710 may grant the wireless device 104 access to the computer system 710, another computer system, and/or the like.

Each of the processor 712, the memory 714, the storage device 716, and the input/output device 718 may, for example, be interconnected using a system bus 720. The processor 712 may be capable of processing instructions for execution within the computer system 710, such as the mobile number security application 755. In one implementation, the processor 712 is a single-threaded processor. In another implementation, the processor 712 is a multi-threaded processor. The processor 712 may be capable of processing instructions stored in the memory 714 or on the storage device 716 to provide communications to the wireless device 104. In some embodiments, a parallel processing set of systems connected over a network may be employed, clustered into one or more server centers.

The memory 714 may store information within the computer system 710. In one implementation, the memory 714 is a computer-readable medium. In one implementation, the memory 714 is a volatile memory unit. In another implementation, the memory 714 is a non-volatile memory unit. The storage device 716 may be capable of providing mass storage for the computer system 710. In one implementation, the storage device 716 may be a computer-readable medium. In various different implementations, the storage device 716 can, for example, include a hard disk device, an optical disk device, and/or some other large capacity storage device. The input/output device 718 provides input/output operations for the computer system 710 that may include connecting the computer system 710 to a network 726 and the wireless device 104.

Figure 3:
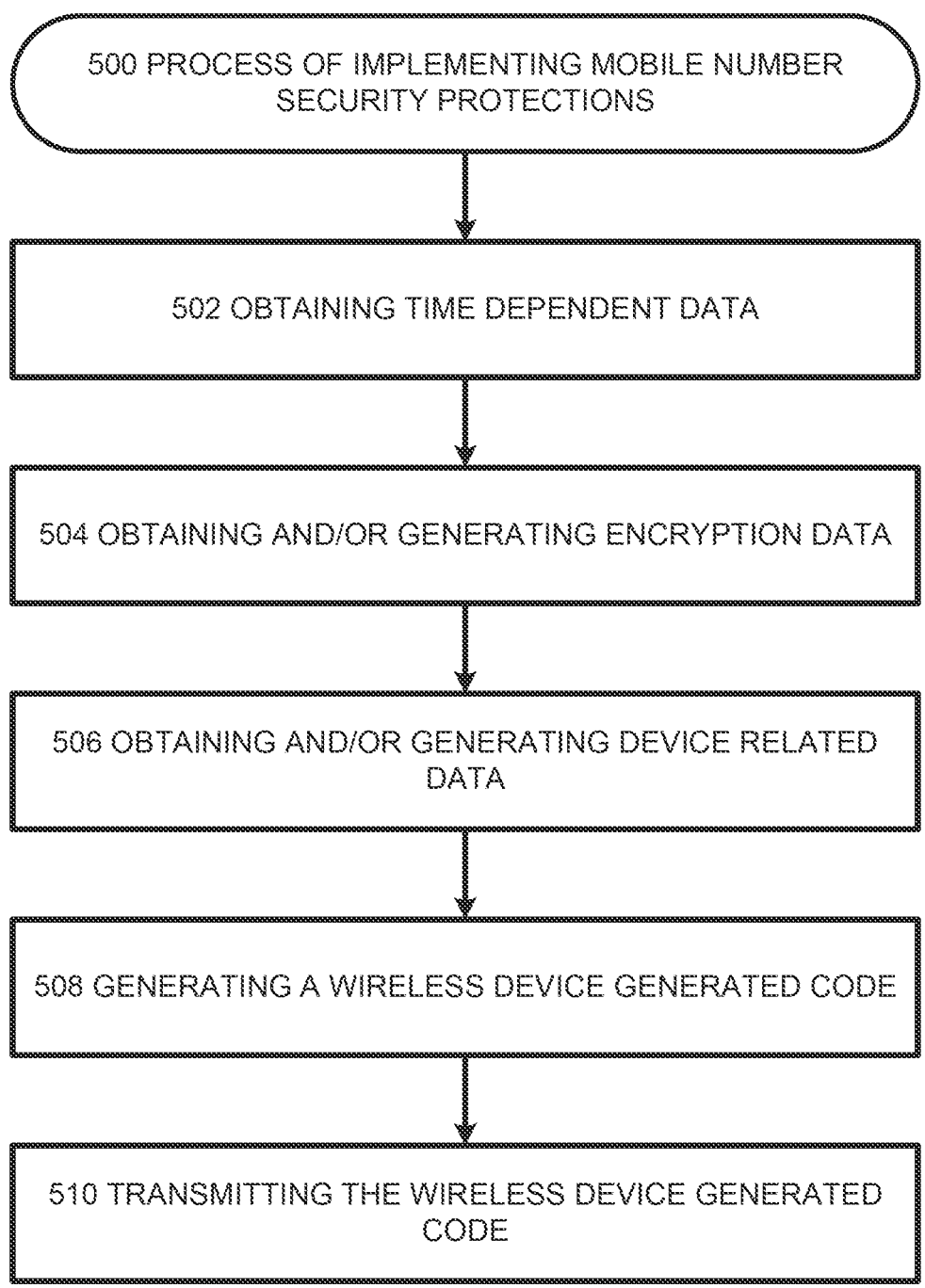
FIG. 3 illustrates an exemplary process that may be used to implement the system of the disclosure.

FIG. 3 illustrates an exemplary process that may be used to implement the system of the disclosure.

In particular, FIG. 3 illustrates a process of implementing mobile number security protections 500. In particular aspects, the process of implementing mobile number security protections 500 may be implemented by the mobile number security application 155. It should be noted that the aspects of the process of implementing mobile number security protections 500 may be performed in a different order consistent with the aspects described herein. Moreover, the process of implementing mobile number security protections 500 may be modified to have more or fewer processes consistent with the various aspects disclosed herein. Additionally, the process of implementing mobile number security protections 500 may include any other aspects of the disclosure described herein.

The process of implementing mobile number security protections 500 may include obtaining time dependent data 502. In particular, the obtaining time dependent data 502 may include obtaining the time dependent data 192 as described herein.

In particular aspects, the transceiver 120 and/or the processor 114 may obtain and/or generate time dependent data 192. The time dependent data 192 may include one or more of a current time that may be obtained from a wireless network, a current date that may be obtained from a wireless network, and/or the like.

The process of implementing mobile number security protections 500 may include obtaining and/or generating encryption data 504. In particular, the obtaining and/or generating encryption data 504 may include obtaining and/or generating the encryption data 194 as described herein. In particular aspects, the obtaining and/or generating encryption data 504 may include obtaining and/or generating the encryption data 194 from the computer system 710, the security system 700, a computer system, a wireless carrier system, and/or the like. The encryption data 194 may include one or more of a secret hash code, a ciphertext, an encryption key, a pseudo-random encryption key, a symmetric-key, a decryption key, a public key, and/or the like.

The process of implementing mobile number security protections 500 may include obtaining and/or generating device related data 506. In particular, the obtaining and/or generating device related data 506 may include obtaining and/or generating the device related data 196 as described herein.

In particular aspects, the device related data 196 may be stored on the wireless device 104. The device related data 196 may include one or more of a Mobile Directory Number (MDN) from the wireless network and/or the wireless device 104, an International Mobile Equipment Identity (IMEI) number from the wireless network and/or the wireless device 104, an Integrated Circuit Card Identifier (ICCID) number from the wireless network and/or the wireless device 104, an Electronic Serial Number (ESN) from the wireless network and/or the wireless device 104, a Mobile Equipment Identifier (MEID) from the wireless network and/or the wireless device 104, a serial number for a subscriber identity module (SIM) card from the wireless network and/or the wireless device 104, and/or the like.

The process of implementing mobile number security protections 500 may include generating a wireless device generated code 508. In particular, the generating a wireless device generated code 508 may include generating the wireless device generated code 182 as described herein.

The generating a wireless device generated code 508 may utilize the time dependent data 192, the encryption data 194, the device related data 196, and/or the like, to generate the wireless device generated code 182. In one aspect, the wireless device generated code 182 may be generated based on one or more of the time dependent data 192, the encryption data 194, and/or the device related data 196. In one aspect, the wireless device generated code 182 may be generated based on all of the time dependent data 192, the encryption data 194, and/or the device related data 196.

In various aspects, the wireless device generated code 182 may be generated by an algorithm, a lookup table, and/or the like based on one or more of the time dependent data 192, the encryption data 194, and/or the device related data 196. The wireless device generated code 182 may uniquely represent symbols, encoded strings, sequences of symbols, a mapping, variable-length codes, a prefix code, data, character encoding, a number of bytes, an encoding, a specific encoding, a markup language, a tag structure, and/or the like. The algorithm generating the wireless device generated code 182 may include a finite sequence of well-defined instructions to perform a computation, calculations, data processing, and/or the like based on one or more of the time dependent data 192, the encryption data 194, and/or the device related data 196. In one aspect, the algorithm generating the wireless device generated code 182 may include a finite sequence of well-defined instructions to perform a computation, calculations, data processing, and/or the like based on a triplet of the time dependent data 192, the encryption data 194, and/or the device related data 196.

The process of implementing mobile number security protections 500 may include transmitting the wireless device generated code 510. In particular, the transmitting the wireless device generated code 510 may include transmitting the wireless device generated code 182 over a communication channel such as the communication channel 724 to the computer system 710, the security system 700, and/or the like.

In particular, the wireless device 104, the mobile number security application 155, the processor 114, and/or the like may transmit the wireless device generated code 182 over a network to the computer system 710 in response to a request by the computer system 710, the security system 700, a request from another computer system, automatically from time to time, and/or the like.

Figure 4:
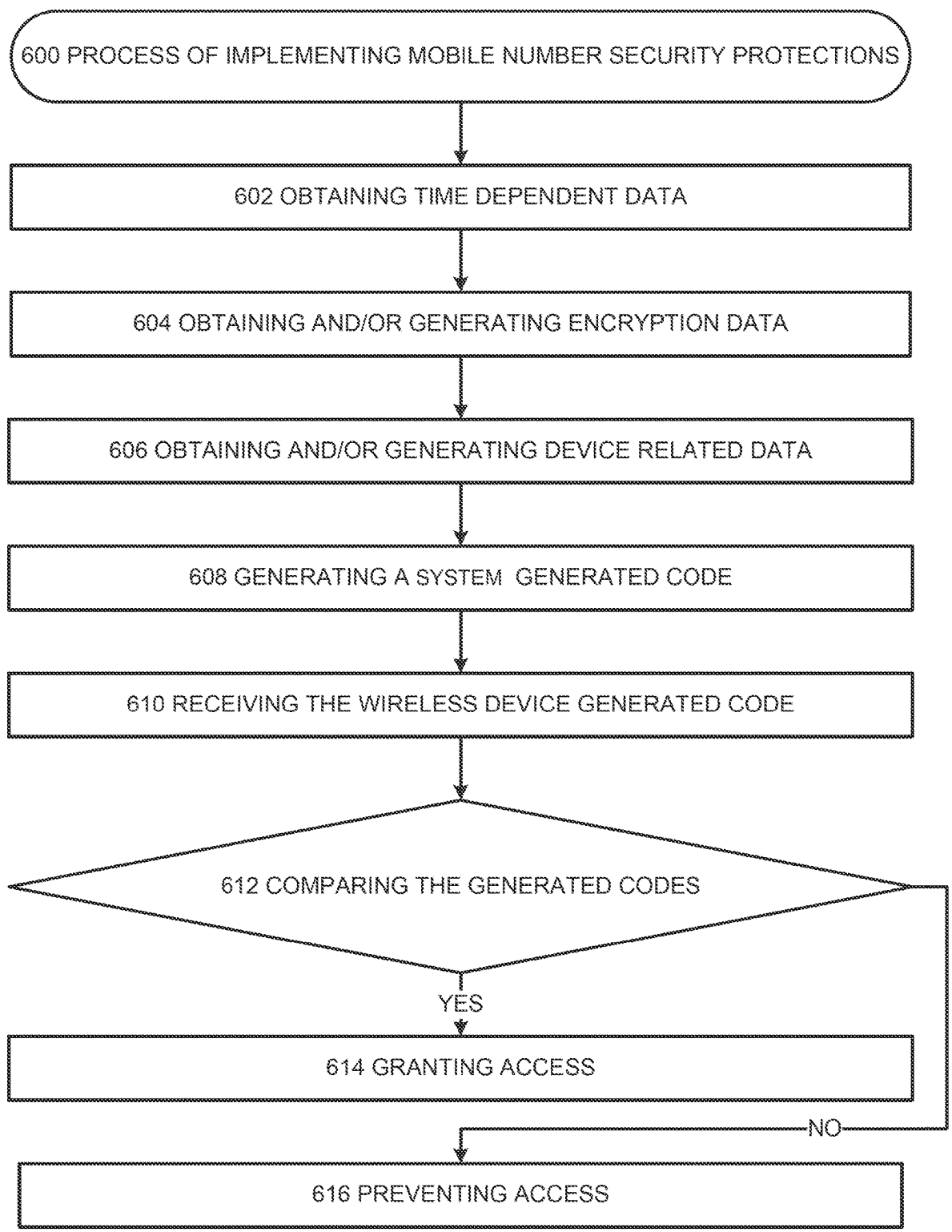
FIG. 4 illustrates an exemplary process that may be used to implement the system of the disclosure.

FIG. 4 illustrates an exemplary process that may be used to implement the system of the disclosure.

In particular, FIG. 4 illustrates a process of implementing mobile number security protections 600. In particular aspects, the process of implementing mobile number security protections 600 may be implemented by the mobile number security application 755 implemented by the computer system 710, the security system 700, a computer system, the wireless carrier system and/or the like. It should be noted that the aspects of the process of implementing mobile number security protections 600 may be performed in a different order consistent with the aspects described herein. Moreover, the process of implementing mobile number security protections 600 may be modified to have more or fewer processes consistent with the various aspects disclosed herein. Additionally, the process of implementing mobile number security protections 600 may include any other aspects of the disclosure described herein.

The process of implementing mobile number security protections 600 may include obtaining time dependent data 602. In particular, the obtaining time dependent data 602 may include obtaining the time dependent data 792 as described herein.

In particular aspects, the security system 700 and/or the computer system 710 may obtain and/or generate time dependent data 792. The time dependent data 792 may include one or more of a current time that may be obtained from a wireless network, a current date that may be obtained from a wireless network, and/or the like.

The process of implementing mobile number security protections 600 may include obtaining and/or generating encryption data 604. In particular, the obtaining and/or generating encryption data 604 may include obtaining and/or generating the encryption data 794 as described herein. The encryption data 794 may include one or more of a secret hash code, a ciphertext, an encryption key, a pseudo-random encryption key, a symmetric-key, a decryption key, a public key, and/or the like. In aspects, the encryption data 794 may be generated by the computer system 710, the security system 700, a computer system, a wireless carrier system, and/or the like. Additionally, the computer system 710, the security system 700, a computer system, a wireless carrier system, and/or the like may transmit the encryption data 794 to the wireless device 104 over the communication channel 724.

The process of implementing mobile number security protections 600 may include obtaining and/or generating device related data 606. In particular, the obtaining and/or generating device related data 606 may include obtaining and/or generating the device related data 796 as described herein.

In particular aspects, the device related data 796 may be stored in the security system 700 and/or the computer system 710. The device related data 796 may include one or more of a Mobile Directory Number (MDN) from the wireless network and/or the wireless device 104, an International Mobile Equipment Identity (IMEI) number from the wireless network and/or the wireless device 104, an Integrated Circuit Card Identifier (ICCID) number from the wireless network and/or the wireless device 104, an Electronic Serial Number (ESN) from the wireless network and/or the wireless device 104, a Mobile Equipment Identifier (MEID) from the wireless network and/or the wireless device 104, a serial number for a subscriber identity module (SIM) card from the wireless network and/or the wireless device 104, and/or the like.

The process of implementing mobile number security protections 600 may include generating a system generated code 608. In particular, the generating a system generated code 608 may include generating the system generated code 782 as described herein.

The generating a system generated code 608 may utilize the time dependent data 792, the encryption data 794, the device related data 796, and/or the like, to generate the system generated code 782. In one aspect, the system generated code 782 may be generated based on one or more of the time dependent data 792, the encryption data 794, and/or the device related data 796. In one aspect, the system generated code 782 may be generated based on all of the time dependent data 792, the encryption data 794, and/or the device related data 796.

In various aspects, the system generated code 782 may be generated by an algorithm, a lookup table, and/or the like based on one or more of the time dependent data 792, the encryption data 794, and/or the device related data 796. The system generated code 782 may uniquely represent symbols, encoded strings, sequences of symbols, a mapping, variable-length codes, a prefix code, data, character encoding, a number of bytes, an encoding, a specific encoding, a markup language, a tag structure, and/or the like. The algorithm generating the system generated code 782 may include a finite sequence of well-defined instructions to perform a computation, calculations, data processing, and/or the like based on one or more of the time dependent data 792, the encryption data 794, and/or the device related data 796. In one aspect, the algorithm generating the system generated code 782 may include a finite sequence of well-defined instructions to perform a computation, calculations, data processing, and/or the like based on a triplet of the time dependent data 792, the encryption data 794, and/or the device related data 796.

The process of implementing mobile number security protections 600 may include receiving the wireless device generated code 610 from the wireless device 104. In particular, the receiving the wireless device generated code 610 may include receiving the wireless device generated code 182.

In particular, the wireless device 104, the mobile number security application 755, the processor 114, and/or the like may transmit the wireless device generated code 182 over a network to the computer system 710 in response to a request by the computer system 710, a request from another computer system, automatically from time to time, and/or the like.

The process of implementing mobile number security protections 600 may include comparing the generated codes 612. In particular, the wireless device generated code 182 received from the wireless device 104 and the system generated code 782 generated by the computer system 710 may be compared.

If there is a match (YES) between the wireless device generated code 182 and the system generated code 782, the process of implementing mobile number security protections 600 may advance to a process of granting access 614. If there is no match (NO) between the wireless device generated code 182 and the system generated code 782, the process of implementing mobile number security protections 600 may advance to a process of preventing access 616.

The process of implementing mobile number security protections 600 may include the process of granting access 614. In particular, if there is a match between the wireless device generated code 182 and the system generated code 782, the process of implementing mobile number security protections 600 may advance to a process of granting access 614 to the wireless device 104.

The process of implementing mobile number security protections 600 may include the process of preventing access 616. In particular, if there is no match between the wireless device generated code 182 and the system generated code 782, the process of implementing mobile number security protections 600 may advance to the process of preventing access 616 by the wireless device 104 to a computer system such as the security system 700.

As set forth by the disclosure, the system and process implementing mobile number security protections may provide a unique approach to security as a bad actor would need to gain access to the wireless device, an application implementing the disclosed system and process implementing mobile number security protections and any change of the specific wireless device generated code would break the match. Accordingly, this makes it very difficult for mobile device identification takeovers without actual possession of the wireless device. Accordingly, transactions may have an increased level of security. Additionally, as set forth by the disclosure, the system and process implementing mobile number security protections may be used or shared with other entities as well. Accordingly, transactions conducted with other entities may likewise have an increased level of security. Moreover, as set forth by the disclosure, the system and process implementing mobile number security protections may be used as a replacement for a password. In this regard, the disclosed system and process implementing mobile number security protections may be used as a dynamic password. In particular, a dynamic password that a user does not need to remember.

The following are a number of nonlimiting EXAMPLES of aspects of the disclosure. One EXAMPLE includes: EXAMPLE 1. A system configured to implement mobile number security protections, the system configured to implement mobile number security protections includes: a computer system configured to obtain one or more of time dependent data, encryption data, and device related data; the computer system is further configured to generate a system generated code based on one or more of the time dependent data, the encryption data, and the device related data; the computer system is further configured to receive a wireless device generated code generated by a wireless device; the computer system is further configured to compare the wireless device generated code generated by the wireless device to the system generated code generated by the computer system; the computer system is further configured to allow transactions by the wireless device if the wireless device generated code generated by the wireless device matches the system generated code generated by the computer system; and the computer system is further configured to prevent transactions by the wireless device if the wireless device generated code generated by the wireless device does not match the system generated code generated by the computer system.

The above-noted EXAMPLE may further include any one or a combination of more than one of the following EXAMPLES: 2. The system configured to implement mobile number security protections according to EXAMPLE 1 where the system generated code generated by the computer system is generated by an algorithm based on one or more of the time dependent data, the encryption data, and/or the device related data. 3. The system configured to implement mobile number security protections according to EXAMPLE 1 where the system generated code generated by the computer system is generated by an algorithm based the time dependent data, the encryption data, and/or the device related data. 4. The system configured to implement mobile number security protections according to EXAMPLE 1 where the time dependent data includes at least one of the following: a current time that is obtained from a wireless network and a current date that is obtained from a wireless network. 5. The system configured to implement mobile number security protections according to EXAMPLE 1 where the encryption data includes at least one of the following: a secret hash code, a ciphertext, an encryption key, a pseudo-random encryption key, a symmetric-key, a decryption key, and a public key. 6. The system configured to implement mobile number security protections according to EXAMPLE 1 where the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device. 7. The system configured to implement mobile number security protections according to EXAMPLE 1 where: the time dependent data includes at least one of the following: a current time that is obtained from a wireless network and a current date that is obtained from a wireless network; the encryption data includes at least one of the following: a secret hash code, a ciphertext, an encryption key, a pseudo-random encryption key, a symmetric-key, a decryption key, and a public key; and the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device. 8. The system configured to implement mobile number security protections according to EXAMPLE 1 where the wireless device includes a wireless device processor, a memory, and a transceiver; where the wireless device is configured to obtain one or more of time dependent data, encryption data, and device related data; and where the wireless device is configured to generate the wireless device generated code based on one or more of the time dependent data, the encryption data, and the device related data. 9. The system configured to implement mobile number security protections according to EXAMPLE 8 where the transceiver is configured to transmit the wireless device generated code to the computer system. 10. The system configured to implement mobile number security protections according to EXAMPLE 8 where the wireless device generated code is generated by an algorithm based on one or more of the time dependent data, the encryption data, and/or the device related data. 11. The system configured to implement mobile number security protections according to EXAMPLE 8 where the wireless device generated code is generated by an algorithm based the time dependent data, the encryption data, and/or the device related data. 12. The system configured to implement mobile number security protections according to EXAMPLE 8 where the time dependent data includes at least one of the following: a current time that is obtained from a wireless network and a current date that is obtained from a wireless network. 13. The system configured to implement mobile number security protections according to EXAMPLE 8 where the encryption data includes at least one of the following: a secret hash code, a ciphertext, an encryption key, a pseudo-random encryption key, a symmetric-key, a decryption key, and a public key. 14. The system configured to implement mobile number security protections according to EXAMPLE 8 where the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device. 15. The system configured to implement mobile number security protections according to EXAMPLE 8 where: the time dependent data includes at least one of the following: a current time that is obtained from a wireless network and a current date that is obtained from a wireless network; the encryption data includes at least one of the following: a secret hash code, a ciphertext, an encryption key, a pseudo-random encryption key, a symmetric-key, a decryption key, and a public key; and the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device.

One EXAMPLE includes: EXAMPLE 16. A system configured to implement mobile number security protections, the system configured to implement mobile number security protections includes: a computer system configured to obtain one or more of time dependent data, encryption data, and device related data; the computer system is further configured to generate a system generated code based on one or more of the time dependent data, the encryption data, and the device related data; the computer system is further configured to receive a wireless device generated code generated by a wireless device; the computer system is further configured to compare the wireless device generated code generated by the wireless device to the system generated code generated by the computer system; and the computer system is further configured to allow transactions by the wireless device if the wireless device generated code generated by the wireless device matches the system generated code generated by the computer system.

The above-noted EXAMPLE may further include any one or a combination of more than one of the following EXAMPLES: 17. The system configured to implement mobile number security protections according to EXAMPLE 16 where the computer system is further configured to prevent transactions by the wireless device if the wireless device generated code generated by the wireless device does not match the system generated code generated by the computer system. 18. The system configured to implement mobile number security protections according to EXAMPLE 16 where the system generated code generated by the computer system is generated by an algorithm based on one or more of the time dependent data, the encryption data, and/or the device related data. 19. The system configured to implement mobile number security protections according to EXAMPLE 16 where the system generated code generated by the computer system is generated by an algorithm based the time dependent data, the encryption data, and/or the device related data. 20. The system configured to implement mobile number security protections according to EXAMPLE 16 where the time dependent data includes at least one of the following: a current time that is obtained from a wireless network and a current date that is obtained from a wireless network. 21. The system configured to implement mobile number security protections according to EXAMPLE 16 where the encryption data includes at least one of the following: a secret hash code, a ciphertext, an encryption key, a pseudo-random encryption key, a symmetric-key, a decryption key, and a public key. 22. The system configured to implement mobile number security protections according to EXAMPLE 16 where the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device. 23. The system configured to implement mobile number security protections according to EXAMPLE 16 where: the time dependent data includes at least one of the following: a current time that is obtained from a wireless network and a current date that is obtained from a wireless network; the encryption data includes at least one of the following: a secret hash code, a ciphertext, an encryption key, a pseudo-random encryption key, a symmetric-key, a decryption key, and a public key; and the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device. 24. The system configured to implement mobile number security protections according to EXAMPLE 16 where the wireless device includes a wireless device processor, a memory, and a transceiver; where the wireless device is configured to obtain one or more of time dependent data, encryption data, and device related data; and where the wireless device is configured to generate the wireless device generated code based on one or more of the time dependent data, the encryption data, and the device related data. 25. The system configured to implement mobile number security protections according to EXAMPLE 24 where the transceiver is configured to transmit the wireless device generated code to the computer system. 26. The system configured to implement mobile number security protections according to EXAMPLE 24 where the wireless device generated code is generated by an algorithm based on one or more of the time dependent data, the encryption data, and/or the device related data. 27. The system configured to implement mobile number security protections according to EXAMPLE 24 where the wireless device generated code is generated by an algorithm based the time dependent data, the encryption data, and/or the device related data. 28. The system configured to implement mobile number security protections according to EXAMPLE 24 where the time dependent data includes at least one of the following: a current time that is obtained from a wireless network and a current date that is obtained from a wireless network. 29. The system configured to implement mobile number security protections according to EXAMPLE 24 where the encryption data includes at least one of the following: a secret hash code, a ciphertext, an encryption key, a pseudo-random encryption key, a symmetric-key, a decryption key, and a public key. 30. The system configured to implement mobile number security protections according to EXAMPLE 24 where the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device. 31. The system configured to implement mobile number security protections according to EXAMPLE 24 where: the time dependent data includes at least one of the following: a current time that is obtained from a wireless network and a current date that is obtained from a wireless network; the encryption data includes at least one of the following: a secret hash code, a ciphertext, an encryption key, a pseudo-random encryption key, a symmetric-key, a decryption key, and a public key; and the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device.

One EXAMPLE includes: EXAMPLE 32. A system configured to implement mobile number security protections, the system configured to implement mobile number security protections includes: a computer system configured to obtain one or more of time dependent data, encryption data, and device related data; the computer system is further configured to generate a system generated code based on one or more of the time dependent data, the encryption data, and the device related data; the computer system is further configured to receive a wireless device generated code generated by a wireless device; the computer system is further configured to compare the wireless device generated code generated by the wireless device to the system generated code generated by the computer system; and the computer system is further configured to prevent transactions by the wireless device if the wireless device generated code generated by the wireless device does not match the system generated code generated by the computer system.

The above-noted EXAMPLE may further include any one or a combination of more than one of the following EXAMPLES: 33. The system configured to implement mobile number security protections according to EXAMPLE 32 where the computer system is further configured to allow transactions by the wireless device if the wireless device generated code generated by the wireless device matches the system generated code generated by the computer system. 34. The system configured to implement mobile number security protections according to EXAMPLE 32 where the system generated code generated by the computer system is generated by an algorithm based on one or more of the time dependent data, the encryption data, and/or the device related data. 35. The system configured to implement mobile number security protections according to EXAMPLE 32 where the system generated code generated by the computer system is generated by an algorithm based the time dependent data, the encryption data, and/or the device related data. 36. The system configured to implement mobile number security protections according to EXAMPLE 32 where the time dependent data includes at least one of the following: a current time that is obtained from a wireless network and a current date that is obtained from a wireless network. 37. The system configured to implement mobile number security protections according to EXAMPLE 32 where the encryption data includes at least one of the following: a secret hash code, a ciphertext, an encryption key, a pseudo-random encryption key, a symmetric-key, a decryption key, and a public key. 38. The system configured to implement mobile number security protections according to EXAMPLE 32 where the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device. 39. The system configured to implement mobile number security protections according to EXAMPLE 32 where: the time dependent data includes at least one of the following: a current time that is obtained from a wireless network and a current date that is obtained from a wireless network; the encryption data includes at least one of the following: a secret hash code, a ciphertext, an encryption key, a pseudo-random encryption key, a symmetric-key, a decryption key, and a public key; and the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device. 40. The system configured to implement mobile number security protections according to EXAMPLE 32 where the wireless device includes a wireless device processor, a memory, and a transceiver; where the wireless device is configured to obtain one or more of time dependent data, encryption data, and device related data; and where the wireless device is configured to generate the wireless device generated code based on one or more of the time dependent data, the encryption data, and the device related data. 41. The system configured to implement mobile number security protections according to EXAMPLE 40 where the transceiver is configured to transmit the wireless device generated code to the computer system. 42. The system configured to implement mobile number security protections according to EXAMPLE 40 where the wireless device generated code is generated by an algorithm based on one or more of the time dependent data, the encryption data, and/or the device related data. 43. The system configured to implement mobile number security protections according to EXAMPLE 40 where the wireless device generated code is generated by an algorithm based the time dependent data, the encryption data, and/or the device related data. 44. The system configured to implement mobile number security protections according to EXAMPLE 40 where the time dependent data includes at least one of the following: a current time that is obtained from a wireless network and a current date that is obtained from a wireless network. 45. The system configured to implement mobile number security protections according to EXAMPLE 40 where the encryption data includes at least one of the following: a secret hash code, a ciphertext, an encryption key, a pseudo-random encryption key, a symmetric-key, a decryption key, and a public key. 46. The system configured to implement mobile number security protections according to EXAMPLE 40 where the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device. 47. The system configured to implement mobile number security protections according to EXAMPLE 40 where: the time dependent data includes at least one of the following: a current time that is obtained from a wireless network and a current date that is obtained from a wireless network; the encryption data includes at least one of the following: a secret hash code, a ciphertext, an encryption key, a pseudo-random encryption key, a symmetric-key, a decryption key, and a public key; and the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device.

One EXAMPLE includes: EXAMPLE 48. A process for implementing mobile number security protections, the process for implementing mobile number security protections includes: obtaining with a computer system one or more of time dependent data, encryption data, and device related data; generating with the computer system a system generated code based on one or more of the time dependent data, the encryption data, and the device related data; receiving with the computer system a wireless device generated code generated by a wireless device; comparing with the computer system the wireless device generated code generated by the wireless device to the system generated code generated by the computer system; allowing with the computer system transactions by the wireless device if the wireless device generated code generated by the wireless device matches the system generated code generated by the computer system; and preventing with the computer system transactions by the wireless device if the wireless device generated code generated by the wireless device does not match the system generated code generated by the computer system.

The above-noted EXAMPLE may further include any one or a combination of more than one of the following EXAMPLES: 49. The process for implementing mobile number security protections according to EXAMPLE 48 where the system generated code generated by the computer system is generated by an algorithm based on one or more of the time dependent data, the encryption data, and/or the device related data. 50. The process for implementing mobile number security protections according to EXAMPLE 48 where the system generated code generated by the computer system is generated by an algorithm based the time dependent data, the encryption data, and/or the device related data. 51. The process for implementing mobile number security protections according to EXAMPLE 48 where the time dependent data includes at least one of the following: a current time that is obtained from a wireless network and a current date that is obtained from a wireless network. 52. The process for implementing mobile number security protections according to EXAMPLE 48 where the encryption data includes at least one of the following: a secret hash code, a ciphertext, an encryption key, a pseudo-random encryption key, a symmetric-key, a decryption key, and a public key. 53. The process for implementing mobile number security protections according to EXAMPLE 48 where the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device. 54. The process for implementing mobile number security protections according to EXAMPLE 48 where: the time dependent data includes at least one of the following: a current time that is obtained from a wireless network and a current date that is obtained from a wireless network; the encryption data includes at least one of the following: a secret hash code, a ciphertext, an encryption key, a pseudo-random encryption key, a symmetric-key, a decryption key, and a public key; and the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device. 55. The process for implementing mobile number security protections according to EXAMPLE 48 where the wireless device includes a wireless device processor, a memory, and a transceiver, the process for implementing mobile number security protections includes: obtaining with the wireless device one or more of time dependent data, encryption data, and device related data; and generating with the wireless device the wireless device generated code based on one or more of the time dependent data, the encryption data, and the device related data. 56. The process for implementing mobile number security protections according to EXAMPLE 55 includes transmitting with the transceiver the wireless device generated code to the computer system. 57. The process for implementing mobile number security protections according to EXAMPLE 55 where the wireless device generated code is generated by an algorithm based on one or more of the time dependent data, the encryption data, and/or the device related data. 58. The process for implementing mobile number security protections according to EXAMPLE 55 where the wireless device generated code is generated by an algorithm based the time dependent data, the encryption data, and/or the device related data. 59. The process for implementing mobile number security protections according to EXAMPLE 55 where the time dependent data includes at least one of the following: a current time that is obtained from a wireless network and a current date that is obtained from a wireless network. 60. The process for implementing mobile number security protections according to EXAMPLE 55 where the encryption data includes at least one of the following: a secret hash code, a ciphertext, an encryption key, a pseudo-random encryption key, a symmetric-key, a decryption key, and a public key. 61. The process for implementing mobile number security protections according to EXAMPLE 55 where the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device. 62. The process for implementing mobile number security protections according to EXAMPLE 55 where: the time dependent data includes at least one of the following: a current time that is obtained from a wireless network and a current date that is obtained from a wireless network; the encryption data includes at least one of the following: a secret hash code, a ciphertext, an encryption key, a pseudo-random encryption key, a symmetric-key, a decryption key, and a public key; and the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device.

One EXAMPLE includes: EXAMPLE 63. A process for implementing mobile number security protections, the process for implementing mobile number security protections includes: obtaining with a computer system one or more of time dependent data, encryption data, and device related data; generating with the computer system a system generated code based on one or more of the time dependent data, the encryption data, and the device related data; receiving with the computer system a wireless device generated code generated by a wireless device; comparing with the computer system the wireless device generated code generated by the wireless device to the system generated code generated by the computer system; and allowing with the computer system transactions by the wireless device if the wireless device generated code generated by the wireless device matches the system generated code generated by the computer system.

The above-noted EXAMPLE may further include any one or a combination of more than one of the following EXAMPLES: 64. The process for implementing mobile number security protections according to EXAMPLE 63 includes preventing with the computer system transactions by the wireless device if the wireless device generated code generated by the wireless device does not match the system generated code generated by the computer system. 65. The process for implementing mobile number security protections according to EXAMPLE 63 where the system generated code generated by the computer system is generated by an algorithm based on one or more of the time dependent data, the encryption data, and/or the device related data. 66. The process for implementing mobile number security protections according to EXAMPLE 63 where the system generated code generated by the computer system is generated by an algorithm based the time dependent data, the encryption data, and/or the device related data. 67. The process for implementing mobile number security protections according to EXAMPLE 63 where the time dependent data includes at least one of the following: a current time that is obtained from a wireless network and a current date that is obtained from a wireless network. 68. The process for implementing mobile number security protections according to EXAMPLE 63 where the encryption data includes at least one of the following: a secret hash code, a ciphertext, an encryption key, a pseudo-random encryption key, a symmetric-key, a decryption key, and a public key. 69. The process for implementing mobile number security protections according to EXAMPLE 63 where the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device. 70. The process for implementing mobile number security protections according to EXAMPLE 63 where: the time dependent data includes at least one of the following: a current time that is obtained from a wireless network and a current date that is obtained from a wireless network; the encryption data includes at least one of the following: a secret hash code, a ciphertext, an encryption key, a pseudo-random encryption key, a symmetric-key, a decryption key, and a public key; and the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device. 71. The process for implementing mobile number security protections according to EXAMPLE 63 where the wireless device includes a wireless device processor, a memory, and a transceiver, the process for implementing mobile number security protections includes: obtaining with the wireless device one or more of time dependent data, encryption data, and device related data; and generating with the wireless device the wireless device generated code based on one or more of the time dependent data, the encryption data, and the device related data. 72. The process for implementing mobile number security protections according to EXAMPLE 71 includes transmitting with the transceiver the wireless device generated code to the computer system. 73. The process for implementing mobile number security protections according to EXAMPLE 71 where the wireless device generated code is generated by an algorithm based on one or more of the time dependent data, the encryption data, and/or the device related data. 74. The process for implementing mobile number security protections according to EXAMPLE 71 where the wireless device generated code is generated by an algorithm based the time dependent data, the encryption data, and/or the device related data. 75. The process for implementing mobile number security protections according to EXAMPLE 71 where the time dependent data includes at least one of the following: a current time that is obtained from a wireless network and a current date that is obtained from a wireless network. 76. The process for implementing mobile number security protections according to EXAMPLE 71 where the encryption data includes at least one of the following: a secret hash code, a ciphertext, an encryption key, a pseudo-random encryption key, a symmetric-key, a decryption key, and a public key. 77. The process for implementing mobile number security protections according to EXAMPLE 71 where the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device. 78. The process for implementing mobile number security protections according to EXAMPLE 71 where: the time dependent data includes at least one of the following: a current time that is obtained from a wireless network and a current date that is obtained from a wireless network; the encryption data includes at least one of the following: a secret hash code, a ciphertext, an encryption key, a pseudo-random encryption key, a symmetric-key, a decryption key, and a public key; and the device related data includes at least one of the following: a mobile directory number of the wireless device, an international mobile equipment identity number of the wireless device, an integrated circuit card identifier number of the wireless device, an electronic serial number of the wireless device, a mobile equipment identifier of the wireless device, and a serial number of a subscriber identity module card of the wireless device.

The term text messaging service, text message, or SMS refers to "short message service" which is a text messaging service component of phone, web, or mobile communication systems. It uses standardized communications protocols to allow fixed line or mobile phone devices to exchange short text messages. SMS was originally designed as part of GSM, but is now available on a wide range of networks, including 3G, 4G, LTE, and 5G networks or networks associated with the communication channel as defined herein. In other aspects, text message may include Multimedia Messaging Service (MMS), which is a standard way to send messages that include multimedia content to and from mobile phones. It extends the core SMS (Short Message Service) capability that allowed exchange of text messages only up to 160 characters in length. While a popular use is to send photographs from camera-equipped handsets, it is also used as a method of delivering news and entertainment content including videos, pictures, text pages, and ringtones. MMS can be used within the context of the present invention for UICC activation message delivery. Of note is that MMS messages are delivered in a completely different way from SMS. The first step is for the sending device to encode the multimedia content in a fashion similar to sending a MIME e-mail (MIME content formats are defined in the MMS Message Encapsulation specification). The message is then forwarded to the carrier's MMS store and forward server, known as the MMSC (Multimedia Messaging Service Centre). If the receiver is on another carrier, the relay forwards the message to the recipient's carrier using the Internet.

The term voice call service, voice, or voice calls as utilized herein may include voice calls defined by 3GPP (3rd Generation Partnership Project) with Voice Call Continuity (VCC) specifications in order to describe how a voice call can be persisted, as a mobile phone moves between circuit switched and packet switched radio domains (3GPP TS 23.206).

The term data service or data as utilized herein includes mobile broadband or wireless Internet access delivered through mobile phone towers over a communication channel as defined herein to computers, mobile phones, wireless devices, and other digital devices as defined herein using portable modems. Some mobile services allow more than one device to be connected to the Internet using a single cellular connection using a process called tethering.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), 5G (fifth generation), W-CDMA (Wideband Code-Division Multiple Access), Wireless Fidelity (Wi-Fi), Bluetooth, Near field communication (NFC), and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

The disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

In an aspect, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

The application described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various embodiments of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

For the purposes of this disclosure a computer readable medium stores computer data, which data can include computer program code that is executable by a processor in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm, or module may reside as one or any combination or set of codes and/or instructions on a computer readable medium or machine readable medium, which may be incorporated into a computer program product.

According to an example, the global navigation satellite system (GNSS) may include a device and/or system that may estimate its location based, at least in part, on signals received from space vehicles (SVs) for the wireless device 104. In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may include, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A computer-implemented system comprising central computer equipment comprising a processor and memory, the memory comprising instructions such that the processor is configured to implement mobile phone number security for a wireless phone carrier protection by:
    obtaining time-dependent data, encryption data, and device-related data pertaining to a wireless device currently connection to the wireless phone carrier;
    generating a first code based on the obtained data;
    obtaining, from the wireless device, a second code generated thereat independently by the wireless device using the time-dependent data, the encryption data, and the device-related data;
    comparing the first and second codes to indicate whether there is a match; and
    determining, based on the comparison whether to allow a set of transactions.

2. The system of claim 1, wherein the first code is dynamically generated by an algorithm implemented at the system.

3. The system of claim 1, wherein the system is further configured to implement mobile number security protection by:
obtaining, from a wireless network, a current time, including a date,
wherein the time-dependent data comprises the obtained time.

4. The system of claim 1, wherein the encryption data comprises at least one of: a secret hash code, a ciphertext, an encryption key, a pseudo-random encryption key, a symmetric-key, a decryption key, or a public key.

5. The system of claim 1, wherein the device-related data comprises at least one of: a mobile directory number of the wireless device, an international mobile equipment identity number of the wireless device, an integrated circuit card identifier number of the wireless device, an electronic serial number of the wireless device, a mobile equipment identifier of the wireless device, or a serial number of a subscriber identity module card of the wireless device.

6. The system of claim 1, wherein the wireless device comprises a wireless device processor, a memory, and a transceiver, and
wherein the transceiver is configured to transmit the second code to the system.

7. The system of claim 1, wherein the second code is dynamically generated by an algorithm based on one or more of the time-dependent data, the encryption data, or the device-related data.

8. The system of claim 1, wherein the system is further configured to implement mobile number security protection by:
replacing implementation of a password check by performing at least one of the comparison or the determination.

9. The system of claim 1, wherein the implementation of the protection secures the mobile number, without a nefarious networking device actually taking possession of the wireless device.

10. The system of claim 1, wherein at least one of the set of transactions has a risk level that satisfies a criterion.

11. A computer-implemented method for implementing mobile phone number security protection for a wireless phone carrier, the method comprising, at central computer equipment of the wireless phone carrier:
obtaining time-dependent data, encryption data, and device-related data pertaining to a wireless device currently connection to the wireless phone carrier;
generating a first code based on the obtained data;
obtaining, from the wireless device, a second code generated-thereat independently by the wireless device using the time-dependent data, the encryption data, and the device-related data;
comparing the first and second codes to indicate whether there is a match; and
determining, based on the comparison whether to allow a set of transactions.

12. The method of claim 11, wherein the first code is dynamically generated by an algorithm implemented at the system.

13. The method of claim 11, wherein the system is configured to implement the mobile number security protection at least by:
obtaining, from a wireless network, a current time, including a date,
wherein the time-dependent data comprises the obtained time.

14. The method of claim 11, wherein the encryption data comprises at least one of: a secret hash code, a ciphertext, an encryption key, a pseudo-random encryption key, a symmetric-key, a decryption key, or a public key.

15. The method of claim 11, wherein the device-related data comprises at least one of: a mobile directory number of the wireless device, an international mobile equipment identity number of the wireless device, an integrated circuit card identifier number of the wireless device, an electronic serial number of the wireless device, a mobile equipment identifier of the wireless device, or a serial number of a subscriber identity module card of the wireless device.

16. The method of claim 11, wherein the wireless device comprises a wireless device processor, a memory, and a transceiver, and
wherein the transceiver is configured to transmit the second code to the system.

17. The method of claim 11, wherein the second code is dynamically generated by an algorithm based on one or more of the time-dependent data, the encryption data, or the device-related data.

18. The method of claim 11, wherein the system is configured to implement the mobile number security protection by:
replacing implementation of a password check by performing at least one of the comparison or the determination.

19. The method of claim 11, wherein the implementation of the protection secures the mobile number, without a nefarious networking device actually taking possession of the wireless device.

* * * * *